United States Patent [19]

Baumbach

[11] Patent Number: 5,065,780

[45] Date of Patent: Nov. 19, 1991

[54] METHOD AND MEANS FOR CONNECTING A BRANCH CONDUIT TO AN EXISTING CONDUIT

[76] Inventor: Thorkild O. Baumbach, Ankarvägen 4, S-761 40 Norrtälje, Sweden

[21] Appl. No.: 476,368

[22] PCT Filed: Nov. 21, 1988

[86] PCT No.: PCT/SE88/00632

§ 371 Date: May 29, 1990

§ 102(e) Date: May 29, 1990

[87] PCT Pub. No.: WO89/04938

PCT Pub. Date: Jun. 1, 1989

[30] Foreign Application Priority Data

Nov. 20, 1987 [SE] Sweden ................. 8704595

[51] Int. Cl.⁵ ................. F16K 43/00; F16K 51/00
[52] U.S. Cl. ................. 137/15; 137/318; 83/54; 409/304; 409/313
[58] Field of Search ............ 137/15, 318; 83/54; 285/197, 198, 199; 408/67, 102, 203.5, 204, 207, 209; 409/304, 313, 326

[56] References Cited

U.S. PATENT DOCUMENTS

| | | | |
|---|---|---|---|
| 1,907,188 | 5/1933 | Ransdell et al. | 137/318 |
| 3,983,897 | 10/1976 | Gebelius | 222/80 |
| 4,261,384 | 4/1981 | Dahlbring | 137/318 |
| 4,415,000 | 11/1983 | Odmann | 137/318 |
| 4,457,204 | 7/1984 | Blomgren | 137/318 |
| 4,541,447 | 9/1985 | Soumar et al. | 137/318 |

FOREIGN PATENT DOCUMENTS

| | | | |
|---|---|---|---|
| 2129250 | 3/1971 | France . | |
| 134966 | 7/1972 | Norway . | |
| 81-00053 | 2/1981 | Sweden . | |
| 425185 | 12/1982 | Sweden . | |
| 2039655 | 8/1980 | United Kingdom | 137/318 |
| 2078889 | 6/1981 | United Kingdom . | |
| 18102 | 4/1961 | World Int. Prop. O. . | |

Primary Examiner—George L. Walton
Attorney, Agent, or Firm—Ladas & Parry

[57] ABSTRACT

A method and apparatus for connecting a branch conduit to an existing conduit (9) through a valve (1, 2), the valve being connected to the conduit in such a way that its flow channel (8) is directed tangentially of the conduit (9). A tool (12, 16, 20) is fixed to the outlet of the valve to cut an opening in the conduit (9) through the open valve (1, 2). The tool is designed with a piston having a side recess (13) formed with a cutting edge (20) so that when the piston is retracted from the flow channel, a portion (14) of the conduit (9) is severed and the severed portion (14) will be caught by and retained within the recess. After closing the valve, the tool is dismounted, the portion (14) is removed together with the tool and the branch conduit is connected in replacement of the tool.

8 Claims, 2 Drawing Sheets

METHOD AND MEANS FOR CONNECTING A BRANCH CONDUIT TO AN EXISTING CONDUIT

TECHNICAL FIELD

The present invention relates to a method and means for connecting a branch conduit to an existing conduit through a valve of such a design that in its open position the valve has a straight flow channel, preferably a valve of plug or ball type. More particularly the invention is adapted for connecting branch conduits to conduits in systems filled with a fluid (liquid or gas).

BACKGROUND ART

Several methods and means for connecting branch conduits via valves to conduits in systems filled with a fluid are previously known. According to one method described in the Swedish patent No. 425 185 the valve is connected to the conduit in such a way that its flow channel will be tangential to the conduit. By means of a completely tight tool fixed to the outlet of the valve a piston could be moved into the flow channel by means of applied forces. The front end of the piston which is shaped as or provided with a separate cutting edge also comprises a portion formed as a hook. During the axial movement of the piston through the flow channel its front end provided with the cutting edge will cut an opening in the conduit. By means of the special design of the piston with a portion formed as a hook the cut-out portion of the conduit will be caught by and maintained in the piston. When the cutting operation has been finished, the piston is brought back to its initial position, the valve is closed and the tool fixed to the outlet of the valve is removed together with the cut-out portion of the conduit. The tool is now replaced by a branch conduit, the valve is opened and the fluid can flow out into the branch.

The design of the front end of the piston with a gap between the cutting edge and a portion formed as a hook for retaining the cut-out portion of the conduit, sets certain requirements on the conduit to which the branching is to be made. The material has to have a certain hardness so that the cut-out portion of the conduit will be fastened in the gap and follow the piston after the cutting operation when the piston is withdrawn into the tool. If the conduit hasn't the assumed hardness but has been subjected to changes due to age or if it has been made red-hot for some reason e.g. while bending, so that its material properties have been changed, there is the risk that the cut-out portion of the conduit will be dropped into the conduit. The cut-out portion can then be transported with the fluid be out of order.

SUMMARY OF THE INVENTION

The object of the present invention is on the one hand to eliminate the dependence on the method of the material properties of the conduits and on the other hand to simplify the cutting tool and its handling.

DETAILED DESCRIPTION OF A PREFERRED EMBODIMENT

Figure 1:
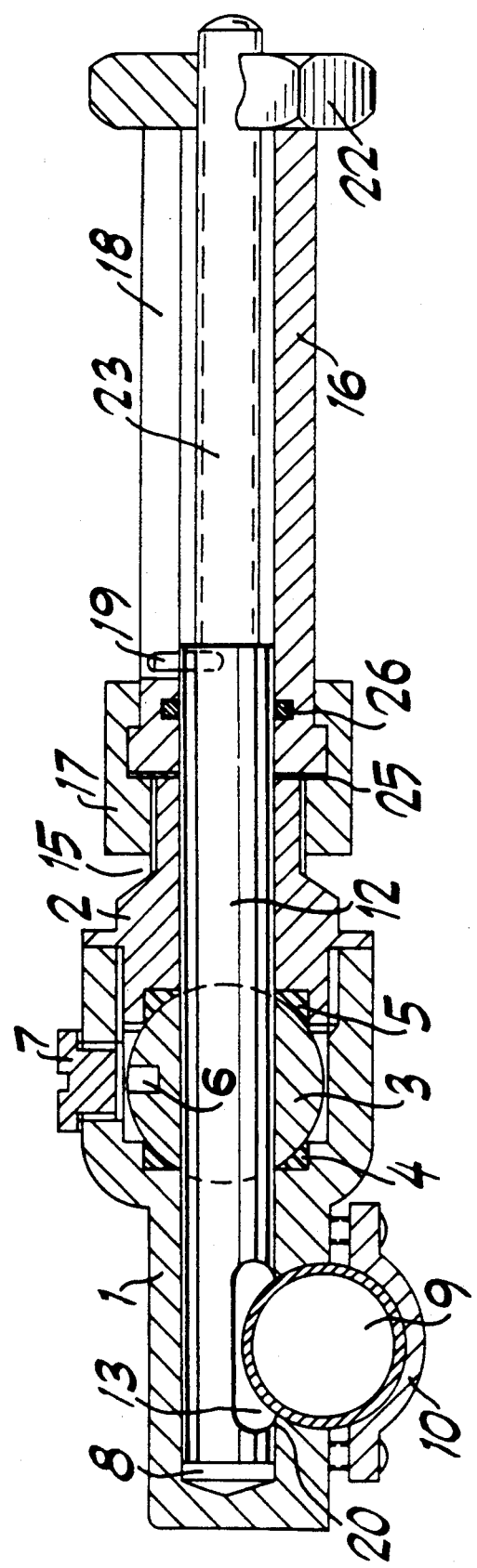
FIG. 1 shows a sectional view of a ball valve fixed to a conduit and, an embodiment of a cutting tool an outlet of the valve is shown in the initial position.
Figure 2:
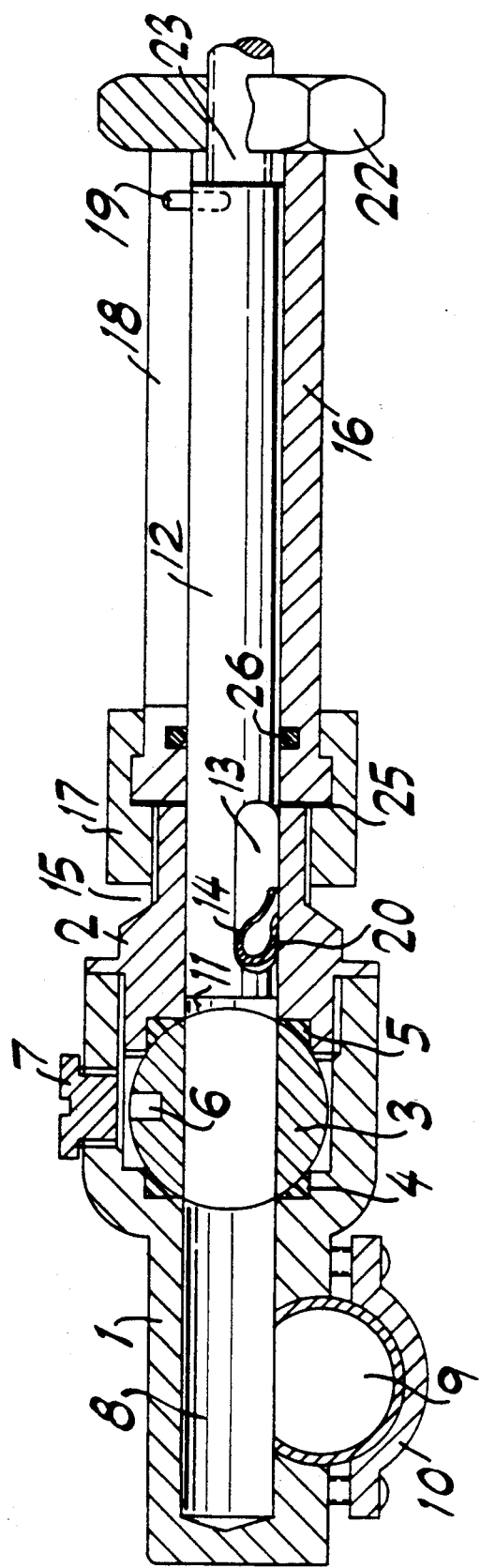
FIG. 2 shows the same valve and tool as in FIG. 1 but after the cutting of the conduit.

The ball valve shown in FIG. 1 comprises a housing of two parts 1 and 2 in which housing a ball 3 provided with a through hole is arranged. The ball which is fitted between two stuffing washers 4 and 5 is provided with a recess 6 reachable from the outside if a plug 7 is removed. By means of a suitable tool the ball can be rotated in order to adjust or cut off the flow in the flow channel 8. Several plugs 7 with corresponding recesses 6 in the ball could be arranged in the valve housing making it possible to operate the ball from the side which has the best accessibility. The housing part 1 is formed as a conduit connection and encases the conduit 9 shown in cross section and to which the housing is fixed by means of a clamp 10. The outlet 11 FIG. 2 of the valve is arranged in a connection piece 15 located in the housing part 2 to which a branch conduit, not shown, is to be connected. Instead of the branch conduit a tool is connected to the valve in the figure. The tool comprises a housing 16 in which a piston 12 is slidably arranged. The tool housing 16 is fixed to the connection piece 15 by means of a nut 17 arranged around one of its end portions, a nut engaging the screw thread of the connection piece 15. The piston is inserted into the flow channel 8 of the valve until it touches the bottom of the housing part 1. In this position, a cutting recess 13 arranged on one side of the piston 12, is aligned with an opening in the housing part 1 through which opening a portion of the conduit 9 extends into the flow channel 8 and the cutting recess 13 when the tool is fixed to the conduit.

The forming a hole in the conduit 9 is carried out by means of forces applied to the piston 12. The nut 22 arranged on a threaded portion 23 of the piston is tightened against the end portion of the housing 16. Then the piston 12 is moved towards the position shown in FIG. 2. The lefthand portion of the cutting recess 13 shaped as an edge 20 cuts an opening in the conduit and removes the cut or severed portion 14 of the conduit 9. When the piston has reached the position shown in FIG. 2 and the conduit is filled with a fluid the valve is closed by turning the ball so that its through hole will end up perpendicular to the flow channel 8 before the cutting tool is removed. The stuffing washer 25 and the sealing ring 26 prevent fluid in the conduit 9 from passing the tool and the quantity of fluid that after the valve has been closed remains in the outlet, and mostly is lost when the tool is removed, is of no practical importance When the tool has been separated from the valve the cutportion 14 is easily removed from the cutting recess 13.

The shown cutting tool could easily be changed to fit different types of forces acting on the piston. If the slot 18 is eliminated and the nut 22 is substituted by a piston, movable in the housing 16, which in that case must be prolonged and provided with an end stop, the necessary force could be achieved from an explosive cartridge arranged in the tool housing at the end connected to the valve or by means of pressure from a hydraulic pump. The tool also comprises guiding means, not shown, which secure that the cutting recess 13 assumes gets a correct position in relation to the conduit 9.

By means of the proposed method for connection of branch conduits, a reduction of costs is achieved due to the fact that the piston during the cutting operation only has to be moved in one direction.

What is claimed is:

1. A method for connecting a branch conduit to an existing conduit through a valve having a flow channel extending transversely of the existing conduit, said method comprising securing a tool to the valve at a location where the branch conduit is to be attached to the valve, extending a piston from the tool through the flow channel of the valve to a position in which a portion of the existing conduit is received in a recess formed in a side of the piston prior to severing the conduit portion, providing said recess with a sharp internal cutting edge, displacing the piston from said position transversely across said conduit portion received in said recess to cause said cutting edge of the recess in the piston to sever said conduit portion whereby to provide communication between the interior of the existing conduit and said flow channel, transporting the severed portion within said recess as the piston is displaced to a location outside said valve so that the severed portion can be removed, and closing said valve and removing the tool and piston therefrom whereupon a branch conduit can now be connected to the valve and placed into communication with the existing conduit via said valve and said flow channel.

2. A method as claimed in claim 1, wherein said piston is displaced from said position in which the portion of the existing conduit is received in said recess by retracting said piston from said flow channel.

3. A method as claimed in claim 2 wherein said extending and retracting movements of said piston take place in opposite directions.

4. A method as claimed in claim 1 wherein said piston has a front end, said recess being formed at a location spaced from said front end.

5. Apparatus for connecting a branch conduit to an existing conduit through a valve having a flow channel extending transversely of the existing conduit and receiving a portion of the existing conduit therein, said apparatus comprising:

a tool detachably connectable to the valve at a location where the branch conduit is to be attached to the valve, said tool including a displaceable piston movable in said flow channel of the valve prior to serving the conduit portion.

said piston having a recess provided in a side thereof in which said portion of the existing conduit is received therein when said piston is in an extended position in said flow channel, said recess having an internal edge with cutting means for severing said portion of the existing conduit extending into said recess and retaining the severed portion in said recess when said piston is displaced from said extended position transversely across said conduit portion received in said recess to provide a flow communication between the flow channel and the existing conduit.

6. Apparatus as claimed in claim 5 wherein said piston has a front end, said recess being provided at a location spaced from said front end.

7. Apparatus as claimed in claim 6 wherein said valve has a closed bottom facing said front end of the piston when the latter is in said extended position.

8. Apparatus as claimed in claim 6 wherein said cutting means on said edge of said recess is disposed at a forward end of said recess for severing said portion of the existing conduit received in said recess when the piston is displaced from said extended position in a direction opposite the direction in which the piston is advanced into said flow channel.

* * * * *